(12) United States Patent
Ploeckinger et al.

(10) Patent No.: US 11,156,189 B2
(45) Date of Patent: Oct. 26, 2021

(54) METERING VALVE FOR A GASEOUS MEDIUM

(71) Applicant: Robert Bosch GmbH, Stuttgart (DE)

(72) Inventors: Andreas Ploeckinger, Gunskirchen (AT); Bernd Winkler, St. Florian (AT); Thomas Zehetbauer, Feldkirchen an der Donau (AT)

(73) Assignee: ROBERT BOSCH GMBH, Stuttgart (DE)

(*) Notice: Subject to any disclaimer, the term of this patent is extended or adjusted under 35 U.S.C. 154(b) by 16 days.

(21) Appl. No.: 16/634,217

(22) PCT Filed: Jul. 18, 2018

(86) PCT No.: PCT/EP2018/069491
§ 371 (c)(1),
(2) Date: Jan. 27, 2020

(87) PCT Pub. No.: WO2019/020452
PCT Pub. Date: Jan. 31, 2019

(65) Prior Publication Data
US 2021/0088004 A1 Mar. 25, 2021

(30) Foreign Application Priority Data
Jul. 25, 2017 (DE) ............ 10 2017 212 756.2

(51) Int. Cl.
*F02M 21/02* (2006.01)
*F16K 31/06* (2006.01)

(52) U.S. Cl.
CPC ..... *F02M 21/0254* (2013.01); *F16K 31/0655* (2013.01); *F02M 21/0239* (2013.01);
(Continued)

(58) Field of Classification Search
CPC ............ F16K 31/0658; F16K 31/0693; F16K 39/022; F02M 31/0254; F02M 21/0257; F02M 21/0272; F02M 2200/03
(Continued)

(56) References Cited

U.S. PATENT DOCUMENTS 4,240,266 A * 12/1980 Serine .................. F25B 41/20
62/196.4
4,442,998 A 4/1984 Ohyama et al.
(Continued)

FOREIGN PATENT DOCUMENTS

| DE | 10196925 | 4/2004 |
| DE | 102009002836 | 11/2010 |
| DE | 102014212320 | 12/2015 |
| EP | 1872007 | 1/2008 |
| JP | H1047523 A | 2/1998 |

OTHER PUBLICATIONS

International Search Report for Application No. PCT/EP2018/069491 dated Sep. 4, 2018 (English Translation, 2 pages).

*Primary Examiner* — Seth W. Mackay-Smith
(74) *Attorney, Agent, or Firm* — Michael Best & Friedrich LLP

(57) ABSTRACT

The invention relates to a metering valve (1) for a gaseous medium, in particular for a gaseous fuel, comprising a preferably planar valve seat element (2) having at least one flow-through opening (3) for the gaseous medium, a closing element (4) movable in a stroke-like manner and interacting in a sealing manner with the valve seat element (2) in order to release and close the at least one flow-through opening (3), and a corrugated or folding bellows (5) connected to the closing element (4) for delimiting a compensation space (6), which is connected to a pressure space (8) via a recess (7) formed in the closing element (4) so that the same gas pressure prevails in both spaces (6, 8) irrespective of the switched position of the metering valve (1). According to the invention, the compensation space (6) is arranged on the side
(Continued)

of the closing element (4) facing the valve seat element (2) and is delimited in the axial direction by a pressure surface (10) which is formed on the closing element (4) or on a component (11) connected to the closing element (4), in particular a flange component.

15 Claims, 4 Drawing Sheets

(52) U.S. Cl.
CPC ..... *F02M 21/0272* (2013.01); *F02M 2200/16* (2013.01); *F16K 31/0693* (2013.01)

(58) Field of Classification Search
USPC ........................................ 251/129.07, 129.16
See application file for complete search history.

(56) References Cited

U.S. PATENT DOCUMENTS

| | | | | |
|---|---|---|---|---|
| 4,971,104 | A * | 11/1990 | Weber ................ | G05D 16/0616 137/489.5 |
| 5,897,096 | A * | 4/1999 | Nakano ............... | F16K 31/0655 251/65 |
| 6,178,956 | B1 * | 1/2001 | Steinmann ....... | F02M 35/10222 123/568.21 |
| 6,328,054 | B1 * | 12/2001 | Martin ............... | G05D 16/0619 137/15.17 |
| 8,272,399 | B2 * | 9/2012 | Farrow ............... | F16K 31/0689 137/601.02 |
| 9,644,586 | B2 * | 5/2017 | Foerster ............. | F16K 31/0693 |

\* cited by examiner

METERING VALVE FOR A GASEOUS MEDIUM

BACKGROUND OF THE INVENTION

The invention relates to a dosing valve for a gaseous medium.

The preferred area of use of the proposed dosing valve is the supply of fuel to an internal combustion engine, wherein in particular a gas engine or gas/diesel engine of a vehicle, for example a passenger motor vehicle, a utility vehicle, a rail vehicle or a ship, may be involved. In addition to mobile applications, the use of the dosing valve in stationary installations for energy recovery or energy generation is also conceivable.

The laid-open specification DE 10 2009 002 836 A1 discloses a gas valve, in particular a dosing valve for a gaseous medium, having a plate-like valve seat element and a closure body which is able to perform stroke movements in relation to the valve seat element and which serves for opening up and closing off a throughflow opening formed in the valve seat element. The closure body interacts here with an annular sealing seat of the valve seat element, against which the closure body is axially preloaded by means of the spring force of a spring. The opening of the gas valve is effected by means of an electromagnet. In order to ensure the most exact possible dosing of fuel with changing pressure conditions, the gas valve is of pressure-balanced design. For this purpose, the closure body is connected to a flexible separating wall in the form of a corrugated bellows, which delimits, together with the closure body, a rear space arranged on the inflow side. The inflow-side rear space is connected to the outflow side of the gas valve via a connection duct formed in the closure body, so that the same gas pressure prevails on both sides of the closure body. Moreover, the flexible separating wall is fixed to the closure body in a manner in which a surface section, delimiting the rear space, on one side of the closure body is approximately as large as a surface section, bordered by the sealing seat, on the other side of the closure body, said other side facing the valve seat element. In the opening and closing directions, axial forces of the same size act accordingly, with the result that said axial forces cancel one another out in terms of their effect on the closure body. The valve stroke during the opening of the gas valve is thus independent of the pressure conditions prevailing in the gas valve.

SUMMARY OF THE INVENTION

It is the object of the present invention to specify a dosing valve for a gaseous medium that allows compensation of a pneumatic closing force arising from pressure differences, and in addition is of particularly compact construction. The compensation of the pneumatic closing force is intended to contribute to the objective of being able to realize a more efficient and more cost-effective actuator design.

The proposed dosing valve comprises a preferably plate-like valve seat element, which has at least one throughflow opening for the gaseous medium, a closure element, which interacts sealingly with the valve seat element and is able to perform stroke movements and which serves for opening up and closing off the at least one throughflow opening, and a corrugated or fold bellows, which is connected to the closure element and which serves for delimiting a compensation space. The compensation space is connected to a pressure space via a cutout formed in the closure element, so that the same gas pressure prevails in both space irrespective of the switching position of the dosing valve. According to the invention, the compensation space is arranged on that side of the closure element facing the valve seat element and is delimited in an axial direction by a pressure surface which is formed on the closure element or on a component, in particular a flange component, connected to the closure element.

With an increase in the gas pressure in the pressure space, the gas pressure in the compensation space simultaneously increases. This leads to a pneumatic pressure force which acts directly or indirectly on the closure element and which—owing to the position of the compensation space— acts in the opening direction. This means that, via the compensation space, a counterforce to a pneumatic force acting in the closing direction is able to be generated, this leading to the closing force being partially or completely cancelled out.

The extent of the compensation depends on the area ratio of the surfaces of relevance in this context. In this case, firstly, the pressure surface formed directly or indirectly on the closure element and serving for delimiting the compensation space is involved. Secondly, a pressure surface formed on the closure element and formed on that side of the closure element which faces away from the compensation space, or facing the pressure space, is involved. The area ratio decides whether the pneumatic pressure force induced via the pressure space and acting in the closing direction is reduced, balanced or even exceeded, for generating an additional force acting in the opening direction.

Preferably, complete pressure balancing is effected by the compensation effect, with the result that a pressure-balanced dosing valve or a dosing valve having a pressure-balanced closure element is provided. This has the advantage that, firstly, the opening force required for the opening is small, and secondly, the dosing valve closes reliably.

The invention also has the advantage that, with the use of the same standard magnet, larger valve assemblies are able to be realized. Alternatively, the valve size can be maintained, with the result that greater maximum switchable pressure differences are possible. In any case, the area of application of a standard or serial magnet is widened, with the result that an efficient and inexpensive actuator concept is made available.

According to a preferred embodiment of the invention, the closure element is of substantially plate-like form. The plate-like form of the closure element makes possible a particularly compactly constructed arrangement, in particular in an axial direction, with the result that the installation space requirement of the dosing valve can be lowered. In order to allow, with an open dosing valve, a uniform incident flow at the at least one throughflow opening formed in the valve seat element, it is proposed that at least one throughflow opening is likewise arranged in the plate-like closure element and is arranged in a manner offset from the throughflow opening of the valve closure element.

Alternatively or in addition, it is proposed that the preferably plate-like closure element has, on the side facing away from the valve seat element, a pressure surface facing the pressure space. This means that the closure element is flowed against over the pressure surface. It is then possible to select, in a manner dependent on the size of the pressure surface facing the pressure space and according to the degree of compensation to be achieved, the size of the pressure surface which delimits the compensation space.

Furthermore, the closure element and/or the component connected to the closure element extend(s) through the valve seat element. For example, the closure element may have a collar-like attachment, which is led through a cutout in the valve seat element, in order to establish the required connection of the closure element to the corrugated or fold bellows. In order to simplify the fitting, the closure element may also be of multi-part form or be connected to a further component, in particular a flange component. The collar-like attachment or the flange component makes it possible for a sufficiently large pressure surface to be formed, such that it is ensured that the counterforce generated via the latter is large enough to achieve the desired compensation.

Preferably, the corrugated or fold bellows, which serves for delimiting the compensation space, is received at least sectionally in a central cutout in the valve seat element. This allows installation space to furthermore be saved.

It is also proposed that the corrugated or fold bellows is, at its end facing away from the closure element, connected to a plate which delimits the compensation space. The plate seals off the compensation space with respect to the surroundings.

So as to ensure that an increase in the gas pressure in the compensation space leads to a pneumatic pressure force acting on the closure element in the opening direction, it is proposed that the corrugated or fold bellows is, at its end facing away from the closure element, axially supported against a stop surface directly or indirectly via the plate. The stop surface may be formed for example by the valve seat element or by a stop element connected to the valve seat element.

In a refinement of the invention, it is proposed that the corrugated or fold bellows is, at its end facing away from the closure element, fixedly connected to the valve seat element directly or indirectly via the plate. In this way, a compensation device acting in two directions is provided. This means that it is possible to generate not only a counterforce to a pneumatic pressure force acting in the closing direction, but also a counterforce to a pneumatic pressure force acting on the closure element in the opening direction. A "double-acting" corrugated or fold bellows moreover withstands greater counterpressures without opening the valve.

Provided that the corrugated or fold bellows is a double-acting one, this may at the same time form a spring element which is axially preloadable or axially preloaded. The double-acting corrugated or fold bellows thus makes it possible to dispense with one or more restoring springs for resetting the closure element. The spring stiffness of the corrugated or fold bellows is in this case influenced by its geometrical dimensions. If the basic geometry of the corrugated or fold bellows is fixed owing to the requirements (mechanical load capacity, pressures and the like), the spring stiffness can be changed via the number of the corrugations or folds.

Preferably, the pressure surface delimiting the compensation space and the pressure surface, facing the pressure space, of the closure element are arranged so as to be at least partially overlapping in a radial direction. This means that, in a radial direction, the counterforce generated via the compensation space acts in the region of the pneumatic pressure force to be compensated. In this way, an exertion of bending load on the closure element is avoided, with the result that the latter may for example be in the form of a thin plate.

It is furthermore proposed that provision is made of an electromagnet for acting on an armature which is connected to the closure element or which is formed by the closure element. Accordingly, the dosing valve according to the invention is preferably electromagnetically actuable, wherein use is furthermore preferably made of a standard or serial magnet. Electrical energization of the electromagnet results in the build-up of a magnetic field, which generates a magnetic force acting on the armature. The armature moves in the direction of the electromagnet. If the armature is designed as a separate component, which is connected to the closure element, it carries along the closure element, so that the latter is lifted off from the valve seat element and the at least one throughflow opening opens up. If the closure element at the same time forms the armature, the closure element is pulled in the direction of the electromagnet by the magnetic force. The integrated armature function of the closure element leads to a particularly compactly constructed design of the dosing valve according to the invention.

BRIEF DESCRIPTION OF THE DRAWINGS

Preferred embodiments of the invention will be discussed in more detail below on the basis of the appended drawings, in which.

DETAILED DESCRIPTION

Figure 1:
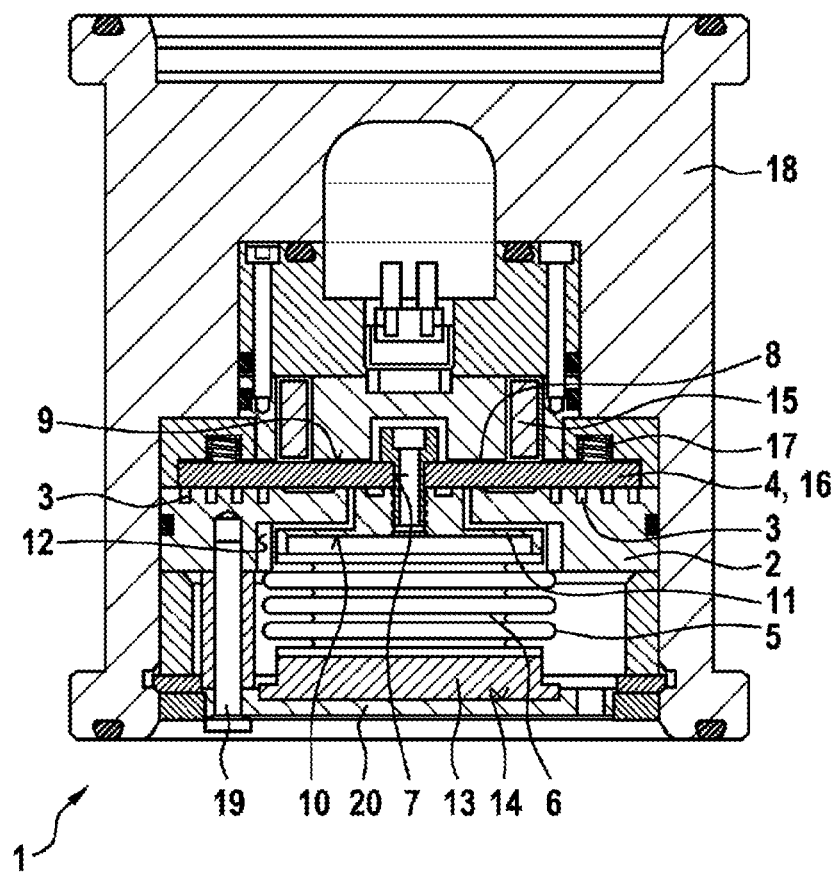
FIG. 1 shows a schematic longitudinal section through a dosing valve according to the invention according to a first preferred embodiment.

The dosing valve 1 illustrated in FIG. 1 serves for dosing a gaseous fuel into an intake tract of an internal combustion engine. Said dosing valve comprises an at least sectionally hollow-cylindrical housing part 18, into which a plate-like valve seat element 2 having multiple concentrically arranged circular arc-shaped throughflow openings 3 is inserted. Arranged above the valve seat element 2 is a closure element 4, which is in the form of a thin plate and is able to perform stroke movements and which, in the closed position, closes off the throughflow openings 3. The closure element 4 is axially preloaded against the valve seat element 2 via springs 17.

In the present case, the plate-like closure element 4 simultaneously forms an armature 16, with the result that installation space is saved. For the purpose of action on the armature 17 or the closure element 4, provision is made of an electromagnet 15 which is arranged above the closure element 4. If the electromagnet 15 is electrically energized, the closure element 4 moves in the direction of the electromagnet 15 counter to the spring force of the springs 17 and the dosing valve 1 opens. In this way, gaseous fuel flows from a pressure space 8 via the throughflow openings 3. If the electrical energization of the electromagnet 15 is ended, the springs 17 reset the closure element 4 into its starting position.

The closure element 4 has a pressure surface 9 which faces the pressure space 8 and against which the gas pressure prevailing in the pressure space 8 is applied. If, with the dosing valve 1 closed, the gas pressure in the pressure space 8 increases, this leads to pressure differences which result in a pneumatic pressure force acting on the closure element 4 in the closing direction. Consequently, the opening force required for opening the dosing valve 1 is increased such that the magnetic force of the electromagnet 15 is possibly no longer sufficient.

In order to prevent this, the illustrated dosing valve 1 according to the invention has a compensation space 6 which is arranged on that side of the closure element 4 facing away from the pressure space 8 and which is connected to the pressure space 8 via a central cutout 7 formed in the closure element 4. In this way, the same gas pressure prevails in the compensation space 6 as in the pressure space 8. The compensation space 6 is delimited in a radial direction by a corrugated bellows 5, which is fixedly connected via a component 11 in the form of a flange component to the closure element 4. This has the result that a pneumatic pressure force acting on the closure element 4 in the opening direction is able to be effected via a pressure surface 10 formed on the flange component, and constitutes a counterforce to the closing force. This is because, at the other end, the corrugated bellows 5 is supported via a plate 13 against a stop surface 14 of a stop element 20 which is fixedly connected by means of a fastening element 19 to the valve seat element 2. If the gas pressure in the compensation space 6 increases according to the gas pressure in the pressure space 8, at least partial compensation of the pneumatic forces acting on the closure element 4 is effected. The extent of the compensation depends here on the area ratio of the pressure surfaces 9, 10.

Figure 2:
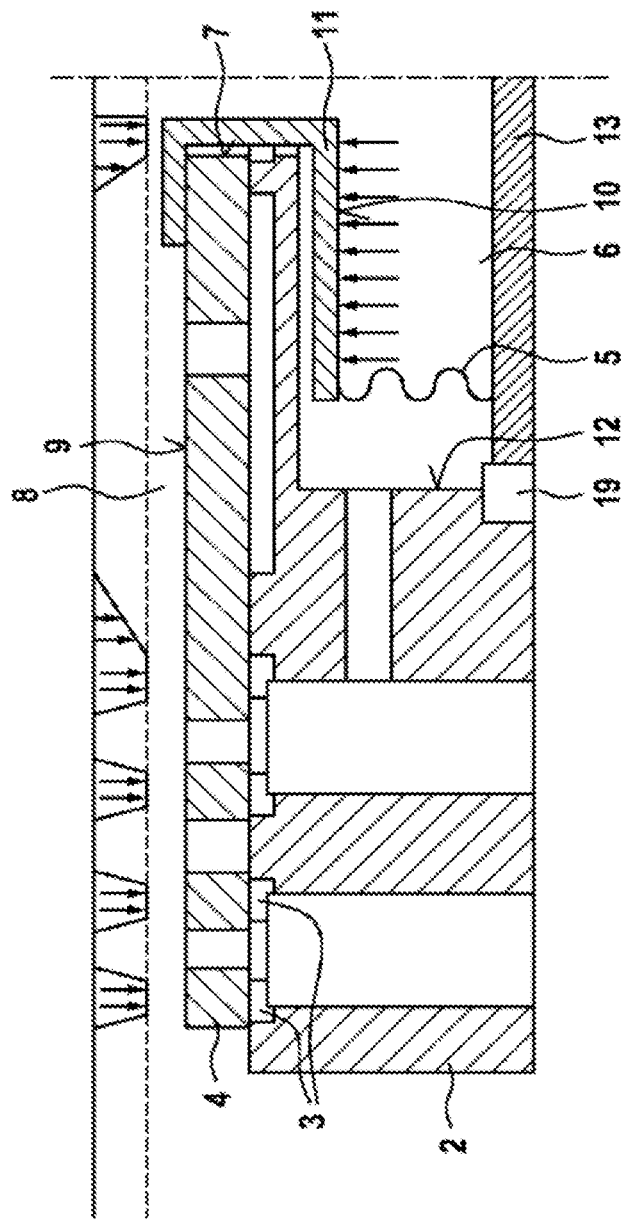
FIG. 2 shows a schematic longitudinal section through a dosing valve according to the invention according to a second preferred embodiment.

A modification of the dosing valve 1 in FIG. 1 can be seen in FIG. 2. In this example, the corrugated bellows 5 is completely received in a central cutout 12 in the valve seat element 2 and is fixedly connected via a plate 13 and a fastening element 19 to the valve seat element 2. The advantages of the corrugated bellows 5 being fixed on both sides will be discussed below in conjunction with the exemplary embodiment in FIGS. 3a and 3b, which shows a similar example.

A closing force acting on the closure element 4 can be seen in FIG. 2, which closing force pushes the closure element 4 in the direction of the valve seat element 2. Said closing force is compensated at least in part by a counterforce which acts on the closure element 4 indirectly via a pressure surface 10 formed on a flange component 11. For this purpose, the flange component 11 is fixedly connected firstly to the closure element 4 and secondly to the corrugated bellows 5. Here, said flange component extends through the central cutout 7 formed in the closure element 4. Since the same gas pressure prevails in the compensation space 6 and in the pressure space 8, the extent of the compensation is determined via the area ratio of the two pressure surfaces 9, 10.

Figure 3A:
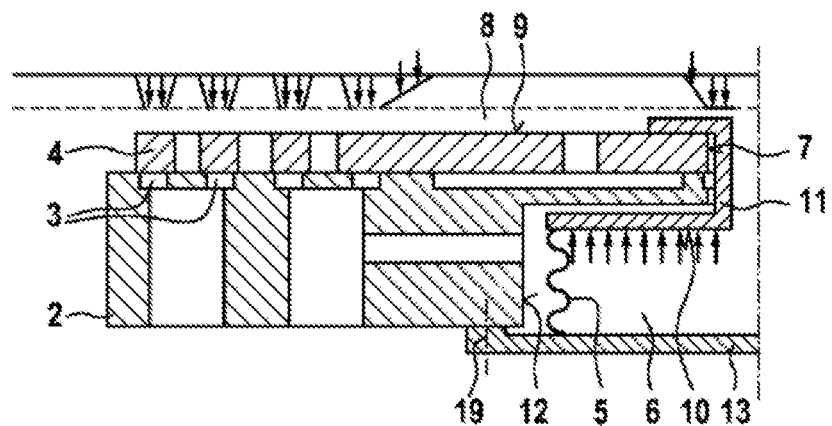
FIGS. 3a and 3b show a schematic longitudinal section through a dosing valve according to the invention according to a third preferred embodiment.
Figure 3B:
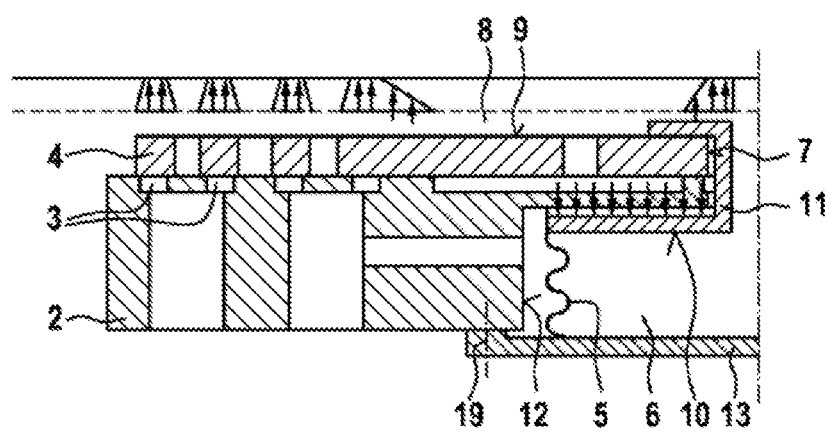

The exemplary embodiment in FIGS. 3a and 3b is formed in a manner substantially the same as the embodiment in FIG. 2. The only difference is in the fastening of the plate 13 to the valve seat element 2.

FIG. 3a shows the operating principle of the compensation via the corrugated bellows 5 with a closing force acting on the closure element 4. FIG. 3b shows a compensation in the opposite direction, that is to say with a pneumatic pressure force which acts on the closure element 4 in the opening direction. This is because, in this case too, at least partial compensation is achieved if the corrugated bellows 5 is, at its end facing away from the closure element 4, fixed directly or indirectly on the valve seat 2 or a housing part.

Figure 4A:
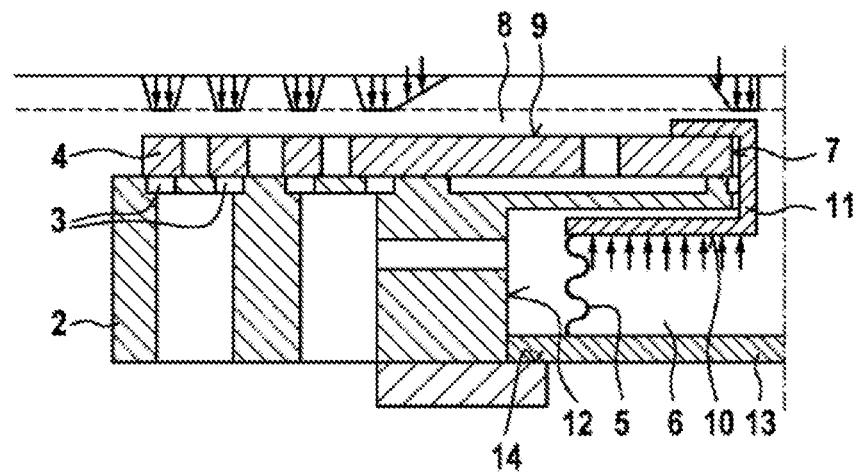
FIGS. 4a and 4b show a schematic longitudinal section through a dosing valve according to the invention according to a fourth preferred embodiment.
Figure 4B:
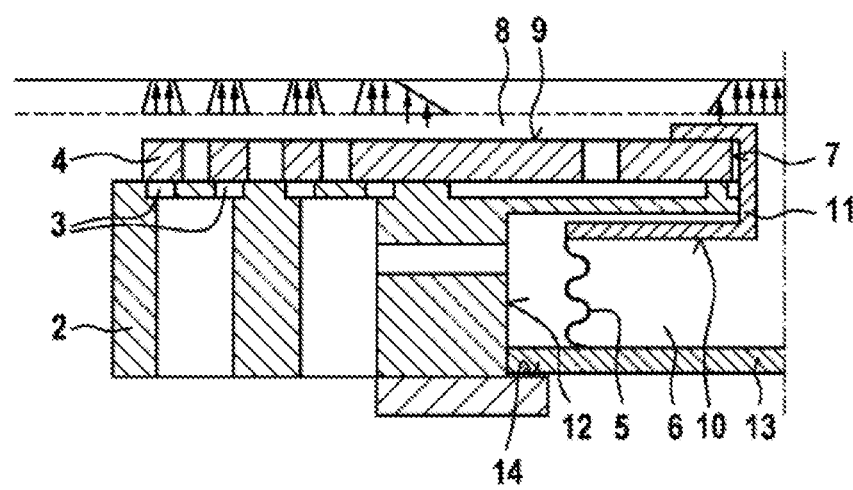

If such fixing is not realized, as illustrated for example in FIGS. 4a and 4b, although compensation of the closing force can be effected (FIG. 4a), compensation of an opening force cannot be effected, since in that case the plate 13 lifts off from the stop surface 14 (FIG. 4b).

What is claimed is:

1. A dosing valve (1) for a gaseous medium, comprising a valve seat element (2), which has at least one throughflow opening (3) for the gaseous medium, a closure element (4), which interacts sealingly with the valve seat element (2), which is configured to perform stroke movements and which serves for opening up and closing off the at least one throughflow opening (3), and a corrugated or fold bellows (5), which is connected to the closure element (4) and which serves for delimiting a compensation space (6) connected to a pressure space (8) via a cutout (7) formed in the closure element (4), so that the same gas pressure prevails in the compensation space (6) and in the pressure space (8) irrespective of a switching position of the dosing valve (1), characterized in that the compensation space (6) is arranged on a side of the closure element (4) facing the valve seat element (2) and is delimited in an axial direction by a first pressure surface (10) which is formed on the closure element (4) or on a component (11) connected to the closure element (4), wherein the closure element (4) is magnetizable, and wherein the dosing valve (1) further comprises an electromagnet (15) that magnetically actuates the closure element (4).

2. The dosing valve (1) as claimed in claim 1, characterized in that the closure element (4) is of substantially plate-like form and/or has, on a side facing away from the valve seat element (2), a second pressure surface (9) facing the pressure space (8).

3. The dosing valve (1) as claimed in claim 2, characterized in that the corrugated or fold bellows (5) forms an axially preloadable or axially preloaded spring element.

4. The dosing valve (1) as claimed in claim 1, characterized in that the closure element (4) and/or the component (11) connected to the closure element (4) extend(s) through the valve seat element (2).

5. The dosing valve (1) as claimed in claim 1, characterized in that the corrugated or fold bellows (5) is received in a central cutout (12) in the valve seat element (2).

6. The dosing valve (1) as claimed in claim 1, characterized in that the corrugated or fold bellows (5) is, at an end facing away from the closure element (4), connected to a plate (13) which delimits the compensation space (6).

7. The dosing valve (1) as claimed in claim 6, characterized in that the corrugated or fold bellows (5) is, at the end facing away from the closure element (4), axially supported against a stop surface (14) directly or indirectly via the plate (13).

8. The dosing valve (1) as claimed in claim 6, characterized in that the corrugated or fold bellows (5) is, at the end facing away from the closure element (4), fixedly connected to the valve seat element (2) directly or indirectly via the plate (13).

9. The dosing valve (1) as claimed in claim 1, characterized in that the first pressure surface (10) delimiting the compensation space (6) and the second pressure surface (9), facing the pressure space (8), of the closure element (4) are arranged so as to be at least partially overlapping in a radial direction.

10. The dosing valve (1) as claimed in claim 1, characterized in that the closure element (4) is a standard or serial magnet.

11. The dosing valve (1) as claimed in claim 1, characterized in that the closure element (4) is configured to move toward the electromagnet (15) when the closure element is moved from a first position closing the at least one throughflow opening (3) to a second position opening the at least one throughflow opening (3).

12. The dosing valve (1) as claimed in claim 1, characterized in that the corrugated or fold bellows (5) is positioned on an opposite side of the armature (16) from the electromagnet (15).

13. The dosing valve (1) as claimed in claim 1, characterized in that the armature (16) extends further radially away from a central axis of the armature (16) than the electromagnet (15) extends radially away from the central axis of the armature.

14. The dosing valve (1) as claimed in claim 13, characterized in that the armature (16) is of substantially plate-like form and has, on a side facing away from the valve seat element (2), a second pressure surface (9) facing the pressure space (8).

15. A dosing valve (1) for a gaseous fuel, comprising a plate-like valve seat element (2), which has at least one throughflow opening (3) for the gaseous medium, a closure element (4), which interacts sealingly with the valve seat element (2), which is configured to perform stroke movements and which serves for opening up and closing off the at least one throughflow opening (3), and a corrugated or fold bellows (5), which is connected to the closure element (4) and which serves for delimiting a compensation space (6) connected to a pressure space (8) via a cutout (7) formed in the closure element (4), so that the same gas pressure prevails in the compensation space (6) and in the pressure space (8) irrespective of a switching position of the dosing valve (1), characterized in that the compensation space (6) is arranged on a side of the closure element (4) facing the valve seat element (2) and is delimited in an axial direction by a pressure surface (10) which is formed on the closure element (4) or on a flange component (11) connected to the closure element (4), wherein the closure element (4) is magnetizable, and wherein the dosing valve (1) further comprises an electromagnet (15) that magnetically actuates the closure element (4).

\* \* \* \* \*